(12) United States Patent
Kang et al.

(10) Patent No.: US 12,360,888 B2
(45) Date of Patent: Jul. 15, 2025

(54) STORAGE DEVICE HAVING FAST CELL INFORMATION AND OPERATION METHOD THEREOF

(71) Applicant: SAMSUNG ELECTRONICS CO., LTD., Suwon-si (KR)

(72) Inventors: Woohyun Kang, Suwon-si (KR); Jinyoung Lee, Suwon-si (KR); Jisoo Kim, Suwon-si (KR); Sangkwon Moon, Suwon-si (KR); Hyunkyo Oh, Suwon-si (KR); Donghoo Lim, Suwon-si (KR); Jin gu Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/590,574

(22) Filed: Feb. 28, 2024

(65) Prior Publication Data

US 2025/0068559 A1 Feb. 27, 2025

(30) Foreign Application Priority Data

Aug. 24, 2023 (KR) ........................ 10-2023-0111145

(51) Int. Cl.
*G06F 12/02* (2006.01)

(52) U.S. Cl.
CPC ................ *G06F 12/0246* (2013.01)

(58) Field of Classification Search
None
See application file for complete search history.

(56) References Cited

U.S. PATENT DOCUMENTS

| | | | |
|---|---|---|---|
| 7,492,641 B2 | 2/2009 | Hosono et al. | |
| 7,551,482 B2 | 6/2009 | Kamei et al. | |
| 7,633,807 B2 | 12/2009 | Chen et al. | |
| 7,848,158 B2 | 12/2010 | Moschiano et al. | |
| 7,961,518 B2 | 6/2011 | Roohparvar | |
| 8,767,475 B2 | 7/2014 | Cho et al. | |
| 9,064,580 B2 | 6/2015 | Senoo et al. | |
| 9,589,661 B2 | 3/2017 | Kim | |
| 9,905,304 B2 | 2/2018 | Park | |
| 11,482,290 B2 | 10/2022 | Lee et al. | |
| 2018/0011527 A1* | 1/2018 | Kim ..................... G06F 3/0679 | |
| 2020/0026646 A1* | 1/2020 | Lee ..................... G11C 11/5628 | |

(Continued)

FOREIGN PATENT DOCUMENTS

| | | |
|---|---|---|
| KR | 10-2008-0091951 A | 10/2008 |
| KR | 10-2009-0106897 A | 10/2009 |

(Continued)

*Primary Examiner* — Kevin Verbrugge
(74) *Attorney, Agent, or Firm* — Sughrue Mion, PLLC

(57) ABSTRACT

A storage device includes a non-volatile memory device configured to store fast cell information obtained from a threshold voltage distribution formed through a one-shot program for memory cells; and a storage controller configured to read the fast cell information from the non-volatile memory device during booting or initialization to perform mapping a fast cell area based on a fast cell management policy, wherein the fast cell information is acquired through the one-shot program performed in a test stage or a mass production evaluation stage, and is stored in the non-volatile memory device before a firmware of the storage controller is executed.

20 Claims, 13 Drawing Sheets

(56) References Cited

U.S. PATENT DOCUMENTS

| | | | |
|---|---|---|---|
| 2020/0104073 A1* | 4/2020 | Byun | G06F 3/0659 |
| 2020/0183588 A1* | 6/2020 | Lee | G06F 3/0649 |
| 2022/0139474 A1* | 5/2022 | Lee | G11C 16/3463 |
| | | | 365/185.22 |

FOREIGN PATENT DOCUMENTS

| | | |
|---|---|---|
| KR | 10-0965076 B1 | 6/2010 |
| KR | 10-1821604 B1 | 1/2018 |
| KR | 10-2221752 B1 | 3/2021 |

* cited by examiner

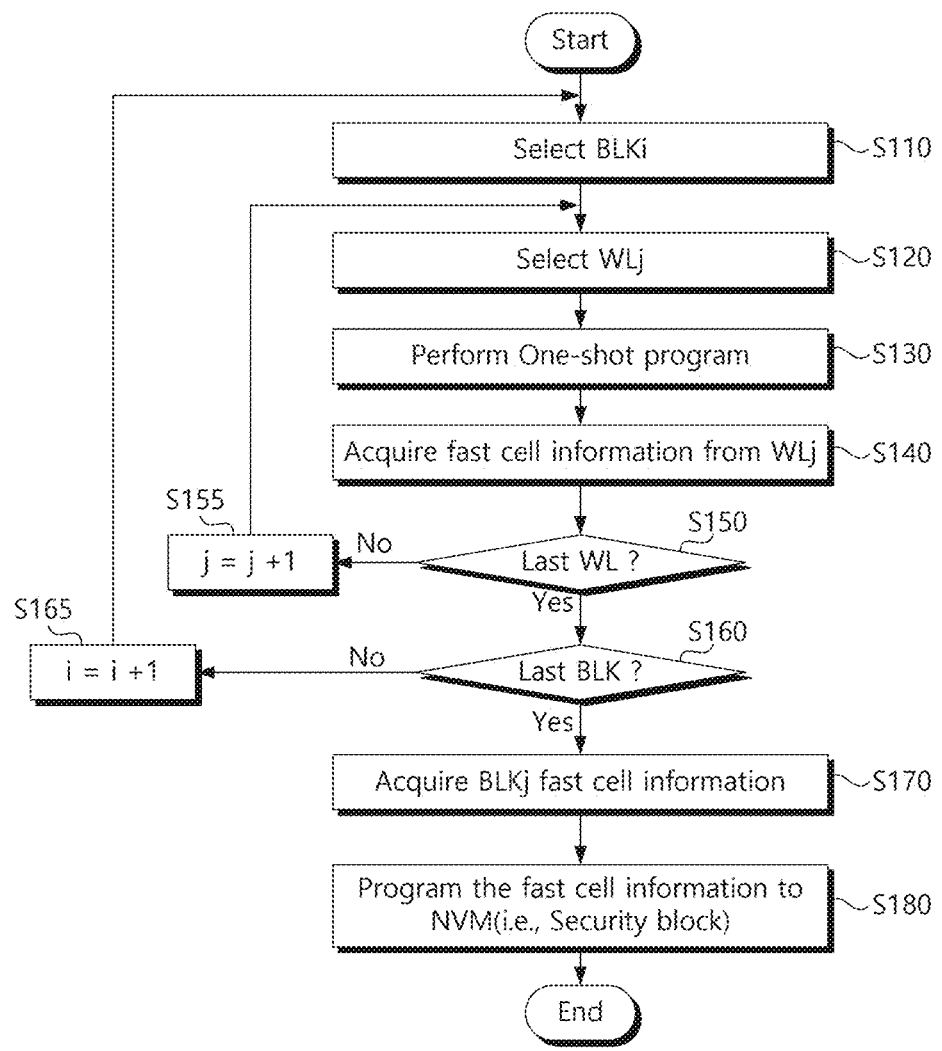

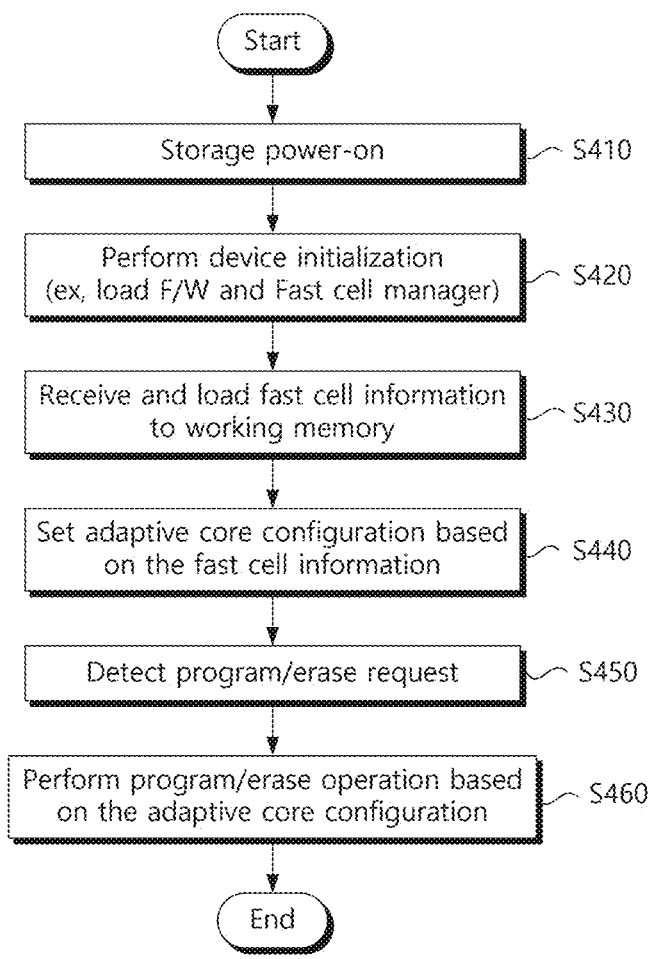

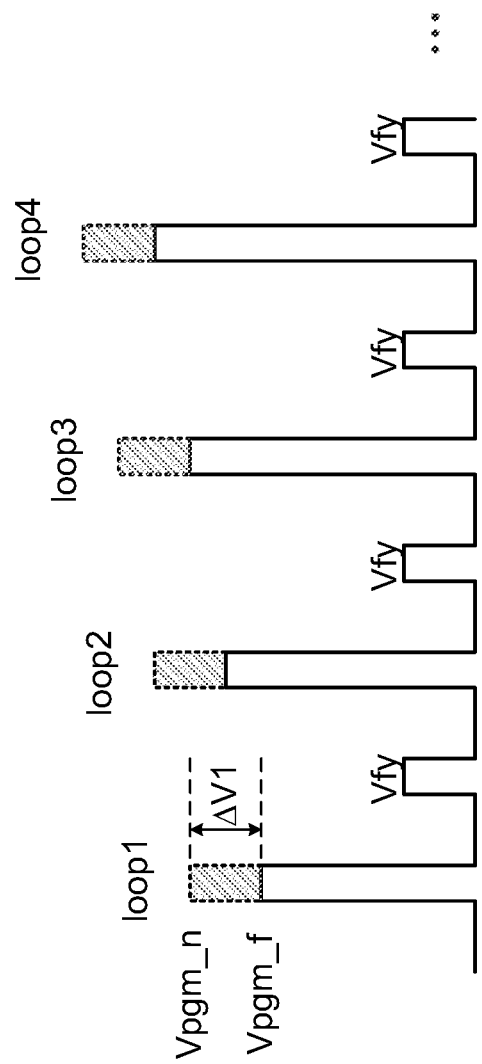

STORAGE DEVICE HAVING FAST CELL INFORMATION AND OPERATION METHOD THEREOF

CROSS-REFERENCE TO RELATED APPLICATIONS

This application claims priority under 35 U.S.C. § 119 to Korean Patent Application No. 10-2023-0111145 filed on Aug. 24, 2023, in the Korean Intellectual Property Office, the disclosure of which is incorporated by reference herein in its entirety.

BACKGROUND

The present disclosure described herein relates to a semiconductor memory device, and more specifically, to a storage device having fast cell information and a method of operating the same.

A memory device stores data in response to write request and outputs the stored data in response to read request. The memory device can be largely divided into volatile memory device and non-volatile memory device. For example, dynamic random-access memory (DRAM) and static random-access memory (SRAM) are volatile memory device in which stored data is lost when the power supply is cut off. On the other hand, flash memory device, phase-change random-access memory (PRAM), magnetic random-access memory (MRAM), and resistive random-access memory (RRAM) are non-volatile memory device that retain stored data even when the power supply is cut off.

Memory cells of a non-volatile memory device are programmed with a threshold voltage corresponding to a data bit value. However, the program speed and retention characteristics of memory cells vary depending on the state of the insulating film forming the memory cell. As degradation progresses, differences in the characteristics of these memory cells act as an important factor causing errors. Therefore, there is a need for various response technologies to prepare for the deterioration of memory cells. However, in order to respond to deterioration, most technologies are related to follow-up measures performed after deterioration occurs.

SUMMARY

Embodiments of the present disclosure provide a non-volatile memory device, a storage device, and a method of operating the same that acquire and store fast cell information in advance before deterioration occurs.

According to an aspect of an embodiment, a storage device includes: a non-volatile memory device configured to store fast cell information obtained from a threshold voltage distribution formed through a one-shot program for memory cells; and a storage controller configured to read the fast cell information from the non-volatile memory device during booting or initialization to perform mapping a fast cell area based on a fast cell management policy, wherein the fast cell information is acquired through the one-shot program performed in a test stage or a mass production evaluation stage, and is stored in the non-volatile memory device before a firmware of the storage controller is executed.

According to an aspect of an embodiment, a method of operating a storage device, includes: loading a firmware for driving the storage device into a working memory of a storage controller; reading a fast cell information programmed in a security area of a non-volatile memory device; loading the fast cell information into the working memory; mapping a fast cell area based on the loaded fast cell information; and applying a fast cell management policy when accessing the mapped fast cell area, wherein the fast cell information is provided in a programmed state in the security area of the non-volatile memory device before an initialization of the firmware.

According to an aspect of an embodiment, a storage device includes: a non-volatile memory device storing a fast cell information; and a storage controller configured to: load and execute a firmware in a working memory during booting or initialization, read the fast cell information from the non-volatile memory device, and apply a fast cell management policy based on the fast cell information, wherein the fast cell information is generated in a test stage or a mass production evaluation stage of the non-volatile memory device to be provided in a programmed state in the non-volatile memory device before the firmware is executed.

BRIEF DESCRIPTION OF THE DRAWINGS

The above and other objects and features of the present disclosure will become apparent by describing in detail embodiments thereof with reference to the accompanying drawings, in which:

FIG. 4 is a flowchart showing a method of obtaining fast cell information according to an embodiment;

FIG. 9 is a flowchart showing the loading and use policy of fast cell information according to an embodiment;

FIG. 10A and FIG. 10B are diagrams showing examples of adaptive core technology according to an embodiment.

DETAILED DESCRIPTION

It is to be understood that both the foregoing general description and the following detailed description are exemplary. Wherever possible, the same reference numbers are used in the description and drawings to refer to the same or like parts.

Figure 1:
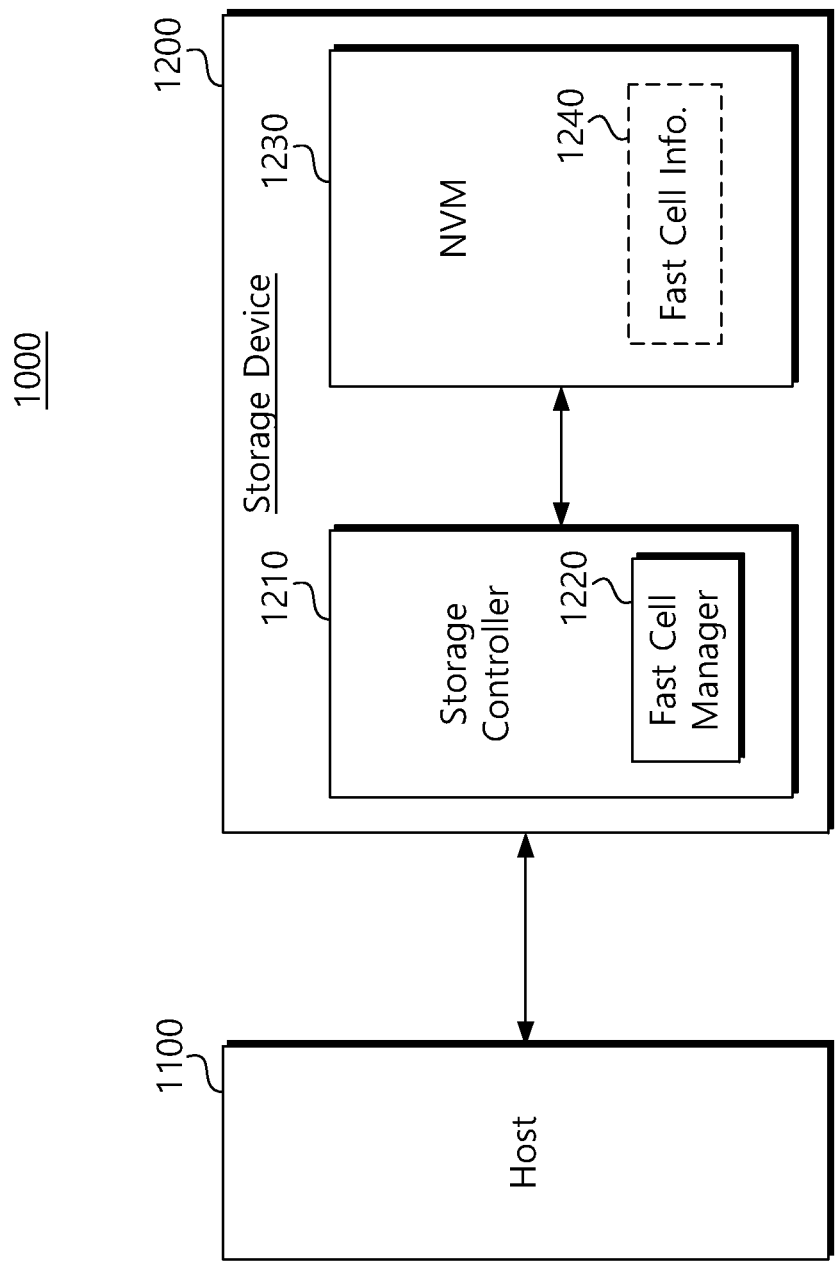
FIG. 1 is a block diagram showing a storage system including a memory device according to an embodiment.

FIG. 1 is a block diagram showing a storage system including a memory device of an embodiment. The storage system 1000 may include a host 1100 and a storage device 1200. The storage device 1200 includes a storage controller 1210 and a non-volatile memory device 1230.

The host 1100 can manage and process overall operations of the storage system 1000. The host 1100 may transmit a read or write request to the storage device 1200. For this, the host 1100 may generate a write command or a read command. The host 1100 may perform various arithmetic/logical operations to access the storage device 1200. For example, host 1100 may include one or more processor cores. The host 1100 may be implemented using a dedicated circuit such as Field Programmable Gate Arrays (FPGA) or Application Specific Integrated Circuit (ASIC), or may be implemented as a System on Chip (SoC). The host 1100 may include a general-purpose processor, a dedicated processor, or an application processor AP. The host 1100 may be the processor itself or an electronic device or system including the processor.

The storage device 1200 may include a storage controller 1210 and a non-volatile memory device 1230. The storage controller 1210 may program data in the non-volatile memory device 1230 according to a write request from the host 1100. Alternatively, the storage controller 1210 may read data stored in the non-volatile memory device 1230 according to a read request from the host 1100. To this end, the storage controller 1210 may manage a mapping table that defines the correspondence between the logical addresses and physical addresses of data stored (or to be stored) in the non-volatile memory device 1230.

Furthermore, the storage controller 1210 may include a fast cell manager 1220. The storage controller and the fast cell manager may be implemented by a processor such as a CPU executing instructions, by customer hardware, by a hardware state machine or by a combination of hardware and software. The instructions may be stored, for example, in the NVM. The fast cell manager 1220 performs a memory management policy using the fast cell information 1240 stored in a security area of the non-volatile memory device 1230 when the storage device 1200 is booted or initialized. For example, the fast cell manager 1220 can manage the program voltage or erase voltage to be applied to a fast cell area differently from that of normal memory cells. Alternatively, the fast cell manager 1220 may use the fast cell area as an area to store frequently updated hot data. The fast cell manager 1220 may be provided in software and loaded into the memory of the storage controller 1210, or may be provided as part of the storage controller 1210 in hardware. The functions and features of the fast cell manager 1220 will be explained in more detail through the drawings described later.

The non-volatile memory device 1230 stores data or outputs the stored data under the control of the storage controller 1210. In particular, the non-volatile memory device 1230 can store fast cell information 1240 in the security area. The fast cell information 1240 is data programmed into the security area of the non-volatile memory device 1230 before the non-volatile memory device 1230 is mounted on the storage device 1200. For example, the fast cell information 1240 may be information stored in the non-volatile memory device 1230 during a mass production evaluation or testing stage of the non-volatile memory device 1230. Accordingly, the fast cell information 1240 is data that is already programmed in the non-volatile memory device 1230 before the firmware in the storage controller 1210 is loaded and driven.

Here, the fast cell information 1240 may be address information of a page or block designated as a fast cell or fast cell area. Alternatively, the fast cell information 1240 may be page data itself formed by a one-shot program. The form or type of the fast cell information 1240 is not limited to the disclosure herein. While the firmware is running and initialization or booting of the storage device 1200 is in progress, fast cell information 1240 is loaded into the storage controller 1210 by the fast cell manager 1220 to be used as data for reliability-based mapping.

Each of the storage controller 1210 and the non-volatile memory device 1230 constituting the storage device 1200 may be provided as one chip, one package, or one module. Alternatively, the storage controller 1210 and the non-volatile memory device 1230 are formed of one chip, one package, or one module, to be provided as a memory system such as a memory card, memory stick, solid state drive (SSD), etc.

The storage system 1000 described above can perform memory management operations by utilizing the fast cell information 1240 already written in the non-volatile memory device 1230 before configuring the storage device 1200. Accordingly, accurate fast cell information generated through a one-shot program in the mass production evaluation stage can be provided, rather than fast cell information detected after a program or erase operation occurs in the non-volatile memory device 1230.

Figure 2:
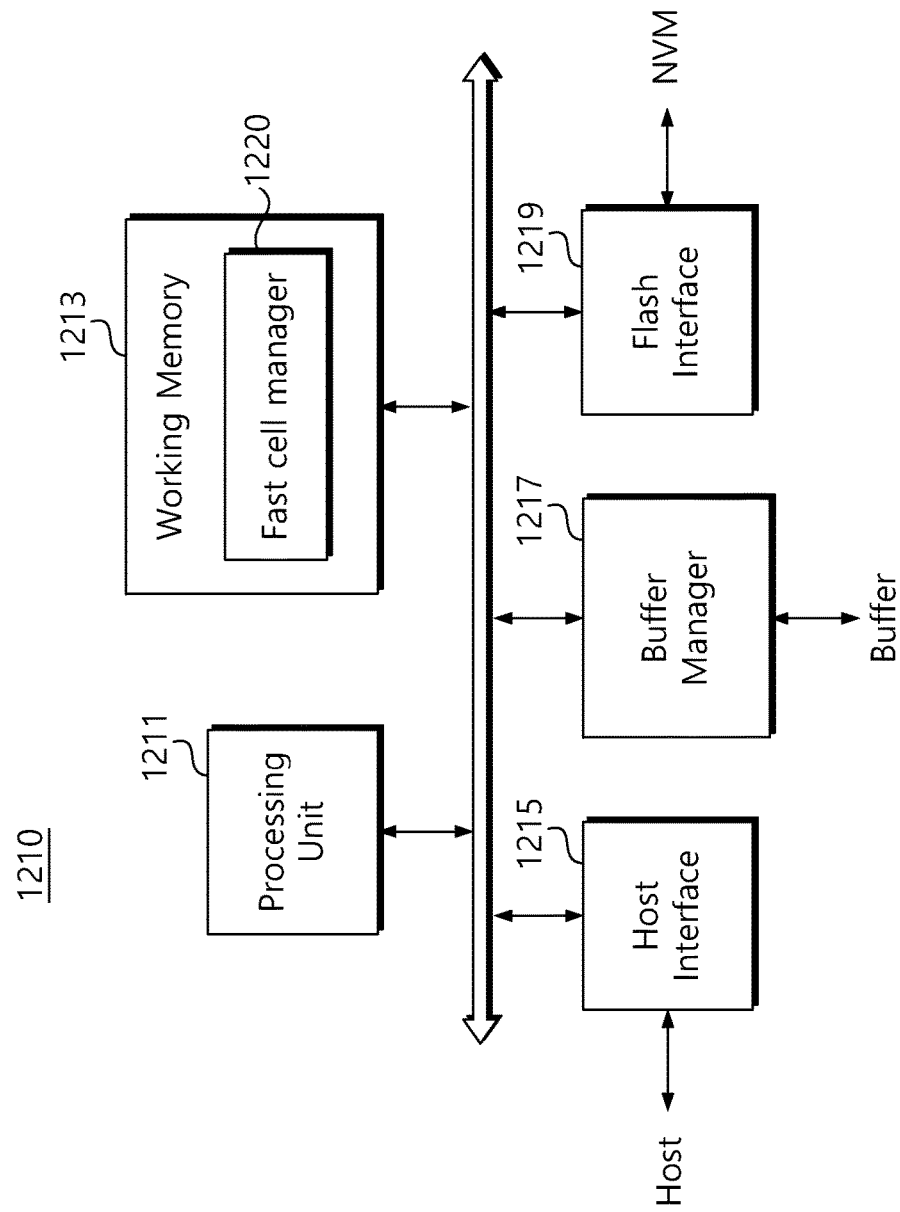
FIG. 2 is a block diagram showing the configuration of the storage controller of FIG. 1 in more detail.

FIG. 2 is a block diagram showing the configuration of the storage controller of FIG. 1 in more detail. Referring to FIG. 2, the storage controller 1210 includes a processing unit 1211, a working memory 1213, a host interface 1215, a buffer manager 1217, and a flash interface 1219. However, it will be understood that the components of the storage controller 1210 are not limited to the components shown. For example, the storage controller 1210 may further include a read only memory ROM that stores code data required for a booting operation or an error correction code ECC block.

The processing unit 1211 may include a central processing unit or a microprocessor. The processing unit 1211 may drive firmware running on the storage controller 1210. In particular, the processing unit 1211 can drive various firmware or software loaded into the working memory 1213. For example, the processing unit 1211 may execute the fast cell manager 1220 loaded into the working memory 1213. In addition, the processing unit 1211 may execute firmware or software responsible for core functions of the storage device 1200, such as a host interface layer HIL or a flash translation layer FTL.

Software (or firmware) or data for controlling the storage controller 1210 is loaded into the working memory 1213. Software and data loaded into the working memory 1213 are driven or processed by the processing unit 1211. In particular, according to an embodiment, the flash translation layer FTL or a fast cell manager 1220 may be loaded into the working memory 1213. Alternatively, the flash translation layer FTL including the functions of the fast cell manager 1220 may be loaded into the working memory 1213. The flash translation layer FTL driven by the processing unit 1211 generally performs functions such as address mapping, garbage collection, and wear leveling.

The fast cell manager 1220 driven by the processing unit 1211 may be loaded into the working memory 1213 when the storage system 1000 is booted or initialized. And when the fast cell manager 1220 is driven by the processing unit 1211, the fast cell manager 1220 reads the fast cell information 1240 stored in the security area of the non-volatile memory device 1230 and loads it into the working memory 1213. And the fast cell manager 1220 will map the memory area of the non-volatile memory device 1230 according to the reliability level based on the fast cell information 1240. For example, the fast cell manager 1220 may map a memory area classified as a fast cell to a frequently updated hot data area. On the other hand, the fast cell manager 1220 may map a memory area classified as a normal cell to a cold data area with a low update frequency.

In another embodiment, the fast cell manager 1220 may manage program or erase conditions differently for the fast cell area and the normal cell area. In short, the fast cell manager 1220 can manage the program voltage or erase voltage levels of fast cells to be lower than those of normal cells. This management method is called adaptive core technology. In other words, the fast cell manager 1220 can apply adaptive core technology based on the fast cell information 1240 loaded into the working memory 1213.

The host interface 1215 provides an interface between a host and the storage controller 1210. The host and the storage controller 1210 may be connected through one of various standard interfaces. Here, the standard interfaces includes various interface methods such as Advanced Technology Attachment (ATA), Serial ATA (SATA), external SATA (e-SATA), Small Computer Small Interface (SCSI), Serial Attached SCSI (SAS), Peripheral component Interconnection (PCI), and PCI Express (PCIe), Universal Serial Bus (USB), IEEE 1394, Universal Flash Storage (UFS), Embedded Multi Media Card (eMMC), and Non-volatile Memory Express (NVMe).

The buffer manager 1217 controls read and write operations of a buffer such as DRAM. For example, the buffer manager 1217 controls the buffer to provide a buffer function for temporarily storing data programmed into the non-volatile memory device 1230 or data output from the non-volatile memory device 1230.

The flash interface 1219 provides an interface between the storage controller 1210 and the non-volatile memory device 1230. For example, data processed by the processing unit 1211 is stored in the non-volatile memory device 1230 through the flash interface 1219. As another example, data stored in the non-volatile memory device 1230 may be exchanged with the storage controller 1210 through the flash interface 1219.

Configurations of the storage controller 1210 illustratively described above have been described. According to the function of the storage controller 1210, the fast cell information 1240 stored in the non-volatile memory device 1230 can be loaded into the working memory 1213 during booting or initialization. And, based on the fast cell information 1240 detected by the fast cell manager 1220 in the mass production evaluation stage, the memory area of the non-volatile memory device 1230 may be mapped according to the reliability level.

Figure 3:
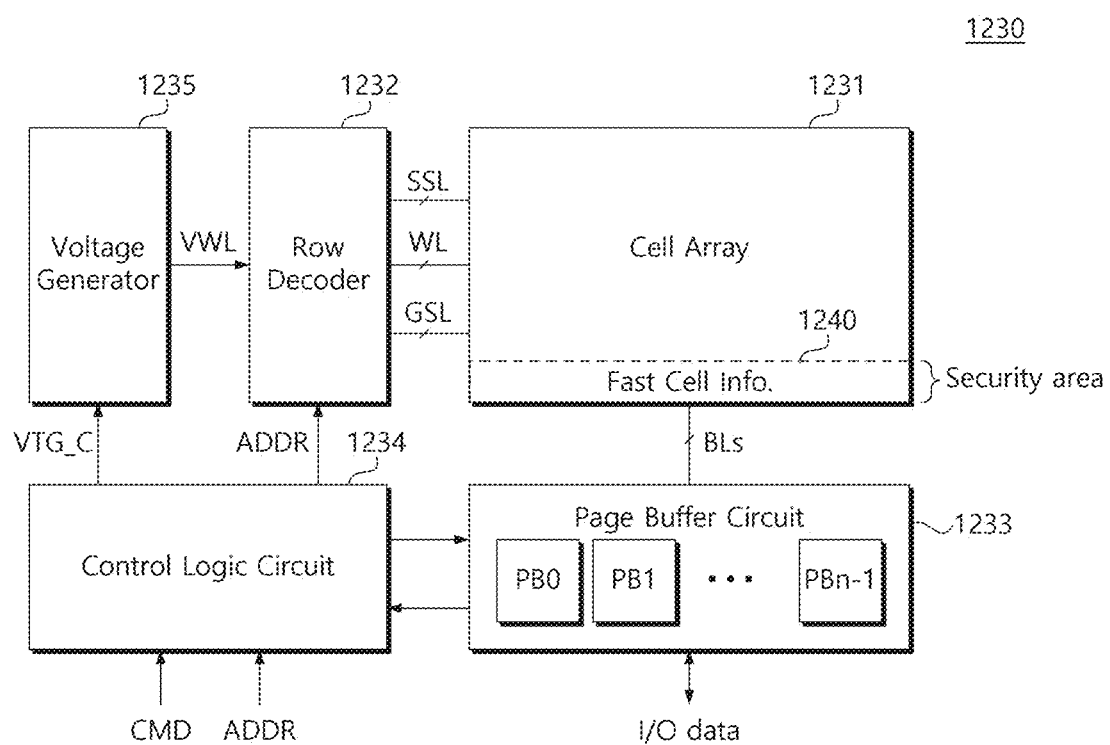
FIG. 3 is a block diagram showing the structure of the non-volatile memory device of FIG. 1.

FIG. 3 is a block diagram briefly showing the structure of the non-volatile memory device of FIG. 1. Referring to FIG. 3, the non-volatile memory device 1230 may include a cell array 1231, a row decoder 1232, a page buffer circuit 1233, a control logic circuit 1234, and a voltage generator 1235. The non-volatile memory device 1230 may further include a data input/output circuit or an input/output interface. Additionally, the non-volatile memory device 1230 may further include components such as column logic, a pre-decoder, a temperature sensor, a command decoder, and an address decoder.

The cell array 1231 may include a plurality of memory blocks. Each of the plurality of memory blocks may include a plurality of memory cells. A plurality of memory blocks may be included in one memory plane, but embodiments are not limited thereto. The cell array 1231 may be connected to the page buffer circuit 1233 through bit lines (BLs), The cell array 1231 may be connected to the row decoder 1232 through word lines (WL), string select lines (SSL), and ground select lines (GSL). In an example embodiment, the cell array 1231 may include a three-dimensional memory cell array.

In particular, there is a security area in the cell array 1231 where access by users is not permitted. And fast cell information 1240 is stored in the security area. Fast cell information 1240 is programmed into the security area before the non-volatile memory device 1230 is mounted on the storage device 1200. The fast cell information 1240 may be information stored in a security area during the mass production evaluation stage of the non-volatile memory device 1230. Accordingly, the fast cell information 1240 already exists in a programmed state in the security area of the cell array 1231 before the firmware in the storage controller 1210 is loaded and driven. The fast cell information 1240 can be read by the fast cell manager 1220 running on the storage controller 1210 (see FIG. 2) and loaded into the working memory 1213 (see FIG. 2).

The row decoder 1232 may select one of the memory blocks of the cell array 1231 in response to the address ADDR. The row decoder 1232 may select one of the word lines of the selected memory block in response to the address ADDR. The row decoder 1232 delivers word line voltage VWL corresponding to the operation mode to the word line of the selected memory block. During a program operation, the row decoder 1232 delivers a program voltage and a verification voltage to the selected word line, and delivers a pass voltage to the unselected word line. During a read operation, the row decoder 1232 delivers a read voltage to the selected word line and a read pass voltage to the unselected word line.

The page buffer circuit 1233 may include a plurality of page buffers PB0 to PBn-1. A plurality of page buffers PB0 to PBn-1 may be respectively connected to memory cells through a plurality of bit lines BLs. The page buffer circuit 1233 may select at least one bit line among the bit lines BLs in response to the column address. The page buffer circuit 1233 may operate as a write driver or a sense amplifier depending on the operation mode. For example, during a program operation, the page buffer circuit 1233 may apply a bit line voltage corresponding to data to be programmed to the selected bit line. During a read operation, the page buffer circuit 1233 may detect data stored in a memory cell by detecting the current or voltage of the selected bit line.

The control logic circuit 1234 can generally control various operations within the non-volatile memory device 1230. The control logic circuit 1234 programs data into the cell array 1231 or reads data from the cell array 1231, or erases data stored in the cell array 1231 in response to a control signal CTRL, a command CMD, and/or an address ADDR. For example, the control logic circuit 1234 may output a voltage control signal VTG_C, an address ADDR, etc. In an exemplary embodiment, the control logic circuit 1234 may output control signals for programming multi-bit data according to the received control signal CTRL, command CMD, and/or address ADDR.

The voltage generator 1235 may generate various types of voltages to perform program, read, and erase operations based on the voltage control signal VTG_C. For example, the voltage generator 1235 may generate a program voltage, a read voltage, and a program verification voltage as the word line voltage VWL. For example, the program voltage may be generated using an Incremental Step Pulse Program ISPP method. The voltage generator 1235 may generate a program voltage or erase voltage for the fast cell differently from that of a normal cell under the control of the storage controller 1210.

In particular, the voltage generator 1235 may provide a program voltage or erase voltage for fast cells at a level different from that for normal cells. That is, during a program operation in the fast cell area mapped through the fast cell information 1240, the voltage generator 1235 may provide a lower level than the program voltage of normal cells. Additionally, during an erase operation in a fast cell area, the voltage generator 1235 may provide an erase voltage that is lower than the erase voltage of normal cells.

The non-volatile memory device 1230 described above can provide fast cell information 1240 prepared in advance during the mass production evaluation stage. Additionally, the non-volatile memory device 1230 may program or erase memory cells according to the fast cell management policy under the control of the storage controller 1210.

FIG. 4 is a flowchart showing a method of obtaining fast cell information according to an embodiment. Referring to FIG. 4, fast cell information of the non-volatile memory device 1230 is obtained in a test stage or mass production evaluation stage through a one-shot program. The circuit arrangement of FIG. 3 may be the target of the one-shot program during the test stage or mass production evaluation stage. Factory test equipment may be used to conduct the test or evaluation. And the obtained fast cell information can be programmed into the security area of the non-volatile memory device 1230. One-shot programs and acquisition of fast cell information can be performed on test equipment or boards provided for mass production evaluation. Hereinafter, the entity that obtains the one-shot program and fast cell information will be referred to as test equipment.

In S110, a memory block BLKi for obtaining fast cell information is selected. Fast cell information can be obtained on a memory block unit or a word line unit. For example, the number of fast cells included in one memory block or the number of fast cells included in one word line can be used as fast cell information. Alternatively, the average or maximum value of the number of fast cells on a word line unit or block unit may be used as fast cell information. In another embodiment, the fast cell information may be data itself obtained by reading the result of a one-shot program in units of word lines or blocks.

In S120, a word line WLj for obtaining one-shot program and fast cell information is selected within the selected memory block BLKi. Here, a one-shot program will be performed on memory cells connected to one word line. Additionally, fast cell information can be obtained by performing a read operation using a reference read voltage Vref for one-shot programmed memory cells. However, it will be well understood that after the one-shot program for an entire memory block is completed, fast cell information may be obtained through a read operation using the reference read voltage Vref on a unit of memory block.

In S130, a one-shot program for the non-volatile memory device 1230 is performed. The program voltage for one-shot programming will be applied through the selected word line. Application of the program voltage may consist of a single loop in which one pulse is applied through the word line. The one-shot program is a detection method to obtain relatively accurate fast cell information. Fast cell information can be obtained by detecting distribution of memory cells of NAND flash memory. In NAND flash memory, the distribution refers to the number of memory cells relative to the threshold voltage. One-shot programming refers to a method of programming memory cells using one program pulse. And the distribution of memory cells formed through a one-shot program is referred to as one-shot distribution.

Generally, a program for writing data to memory cells is performed using an Incremental Step Pulse Programming ISPP method in which gradually increasing pulses are applied and verified during each loop. In this case, the accuracy of identifying fast cells is low. On the other hand, in a one-shot program, one-shot distribution is formed through one application of the program pulse. Therefore, in one-shot distribution, fast cell/slow cell characteristics are clearly displayed.

In S140, the reference read voltage Vref is applied to the word line WLj on which the one-shot program has been completed, and whether the selected memory cells are on/off is sensed. If the threshold voltage of the memory cell is higher than the reference read voltage Vref, it is sensed as an off-cell. On the other hand, if the threshold voltage of the memory cell is lower than the reference read voltage Vref, it will be sensed as on-cell. Ultimately, among memory cells connected to one word line, memory cells that are sensed as off-cells may be determined as fast cells. Fast cell information may be the number of fast cells or the data itself sensed on a word line unit. Fast cell information in units of read word lines can be output to test equipment.

In S150, it is checked whether the word line WLj from which the one-shot program and fast cell information is obtained is the last word line of the selected memory block BLKi. If the word line WLj is not the last word line of the memory block BLKi, the procedure moves to S155. On the other hand, if the word line WLj is the last word line of the memory block BLKi, the procedure moves to S160.

In S155, the word line count is incremented (j=j+1) to select a new word line for the one-shot program. Next, the procedure returns to S120, where the word line of the corresponding count is selected, and the one-shot program and output of fast cell information continue.

In S160, it is checked whether the memory block BLKi from which the one-shot program and fast cell information is obtained is the last memory block of the non-volatile memory device 1230. If the memory block BLKi is not the last memory block, the procedure moves to S165. On the other hand, if the memory block BLKi is the last memory block, the procedure moves to S170.

In S165, the block count is incremented (i=i+1) to select a new memory block for the one-shot program. Then, the procedure returns to S110 and the memory block with the increased count will be selected.

In S170, fast cell information in memory block units may be generated. Fast cell information in memory block units is generated by collecting fast cell information in word line units. Fast cell information on a block basis can be calculated based on the average or maximum value of the number of fast cells of each word line in the block. That is, the fast cell information of one memory block can be expressed as the average value of the number of fast cells in each word line, or as the maximum value of the number of fast cells in each word line. In another embodiment, block-wise fast cell information may be expressed as the total number of fast cells included in the block. In another embodiment, block-wise fast cell information may include location information of a word line where a fast cell exists. In addition, the fast cell information may also include information about blocks in which fast cells exist and blocks in which fast cells do not exist among memory blocks.

In S180, the test equipment programs the obtained fast cell information into a specific memory area of the non-volatile memory device 1230. For example, fast cell information may be programmed in a security area that is not visible to the user among the memory areas of the non-volatile memory device 1230.

In the above, a procedure for obtaining fast cell information of the non-volatile memory device 1230 through the one-shot program according to an embodiment has been described. In addition, the obtained fast cell information can be programmed into the security area of the non-volatile memory device 1230. Fast cell information obtained through the one-shot program may be provided when the non-volatile memory device 1230 is driven by the storage controller 1210. Ultimately, the fast cell information is information obtained before the firmware is driven in the storage controller 1210, and can be provided as a more accurate value than the fast cell information generated when the firmware is driven.

Figure 5A:
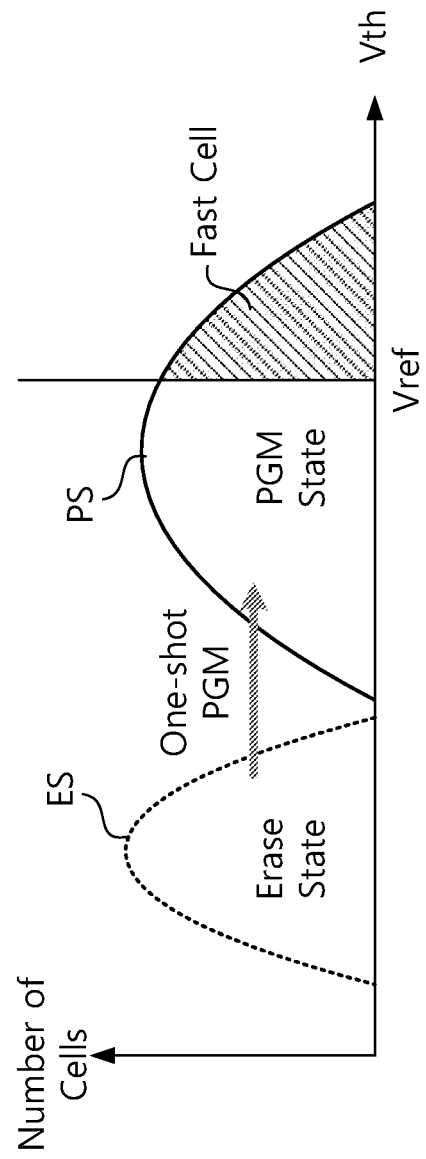
FIG. 5A and FIG. 5B are diagrams showing the effect of the one-shot program and the effect of fast cells on distribution.
Figure 5B:
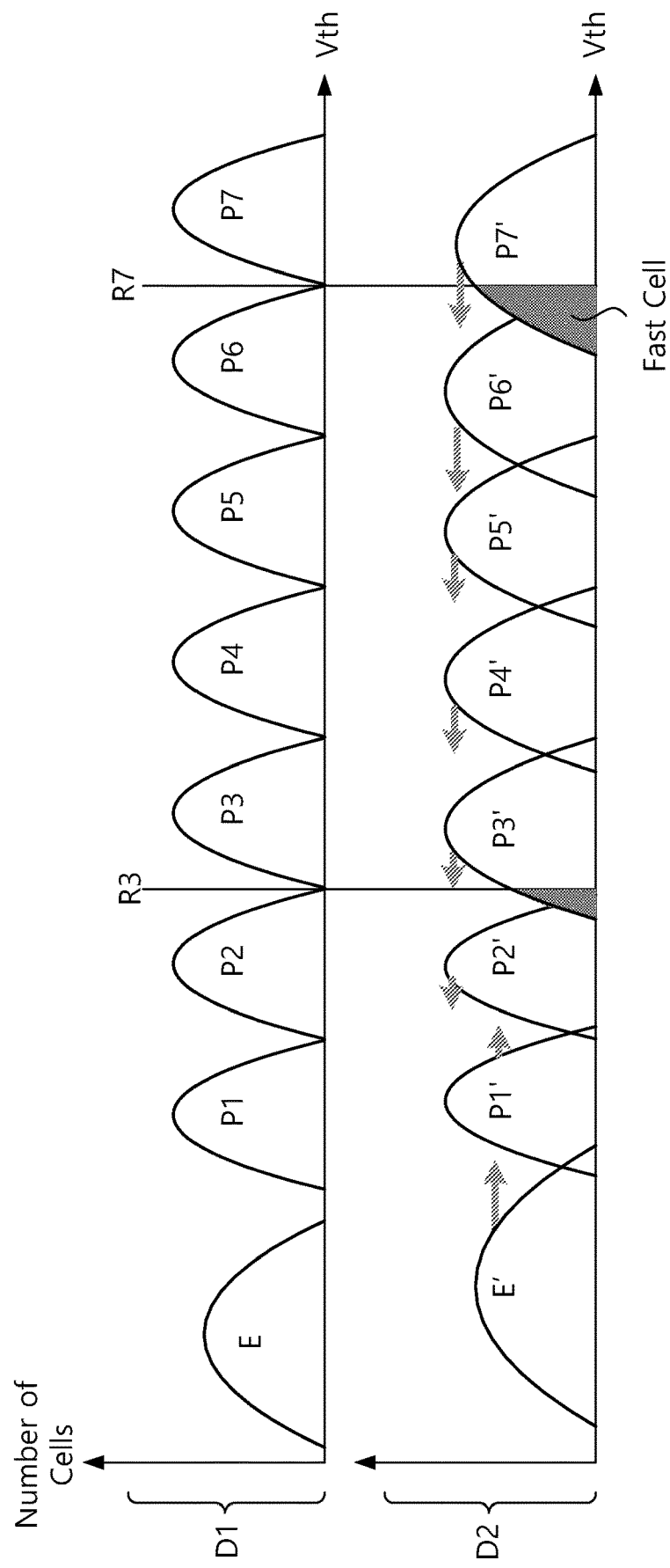

FIG. 5A and FIG. 5B are diagrams showing the effect of a one-shot program and the effect of fast cells on distribution. FIG. 5A shows the distribution of memory cells formed by the one-shot program. FIG. 5B is a diagram showing the effect of fast cells on the distribution of memory cells in a triple-layer cell TLC non-volatile memory device.

Referring to FIG. 5A, the threshold voltage of memory cells increases from the erase state ES to the program state PS through the one-shot program. If the program characteristics of the memory cells are the same, the distribution of the program state PS will be formed in the same shape as the erase state ES even after the one-shot program. However, memory cells have different program characteristics depending on the state of the insulating film. In particular, for fast cells, the increase in threshold voltage is relatively large even when the same program voltage is applied. On the other hand, slow cells have a relatively small increase in threshold voltage even when the same program voltage is applied. Accordingly, the program state PS of memory cells formed after the one-shot program will appear in a widely distributed form. In addition, retention characteristics as well as program characteristics are different between slow cells and fast cells. Since the amount of charge leakage from fast cells is relatively large, the decrease in threshold voltage after programming is more noticeable in fast cells.

Fast cell information is obtained through a read operation using a reference read voltage Vref after the one-shot program. After applying the reference read voltage Vref to the word lines of the memory cells, whether they are off-cell or on-cell is sensed. Memory cells that are sensed as off-cell with respect to the reference read voltage Vref are determined to be fast cells. By counting the number of bits '0' corresponding to off-cells through reading memory cells (e.g., one page) connected to one word line, the number of fast cells can be counted. When the number of fast cells obtained in word line units is collected, it can also be expressed as the number of fast cells in memory block units.

According to the one-shot program, the program voltage is applied to the memory cells once. On the other hand, according to a typical ISPP program, the program voltage is applied multiple times, and cells that are higher than the verification voltage Vfy through repeated verification are inhibited. Therefore, even for memory cells connected to the same word line, the number of times the program voltage is applied actually varies. Ultimately, it is impossible to obtain accurate fast cell information. Therefore, it is possible to accurately identify fast cells among memory cells manufactured through the one-shot program.

Referring to FIG. 5B, the effect of fast cells on changes in distribution of memory cells is briefly shown. The first distribution D1 shows the initial distribution immediately after programming the memory cells. The second distribution D2 shows the retention distribution after a certain period of time has passed since the program. According to the second distribution D2, among the memory cells initially included in the program state P7, there are memory cells whose read voltage is lower than the read voltage R7. Ultimately, the change in threshold voltage that causes this error is due to fast cells. To manage these fast cells, various wear leveling techniques must be used and the frequency of garbage collection also increases. Therefore, performance of the storage device 1200 is degraded due to the fast cells.

Embodiments may perform accurate identification of fast cells. The accurate identification of fast cells is based on the one-shot program and reading before the firmware of the storage device 1200 is driven or during a test stage.

Figure 6:
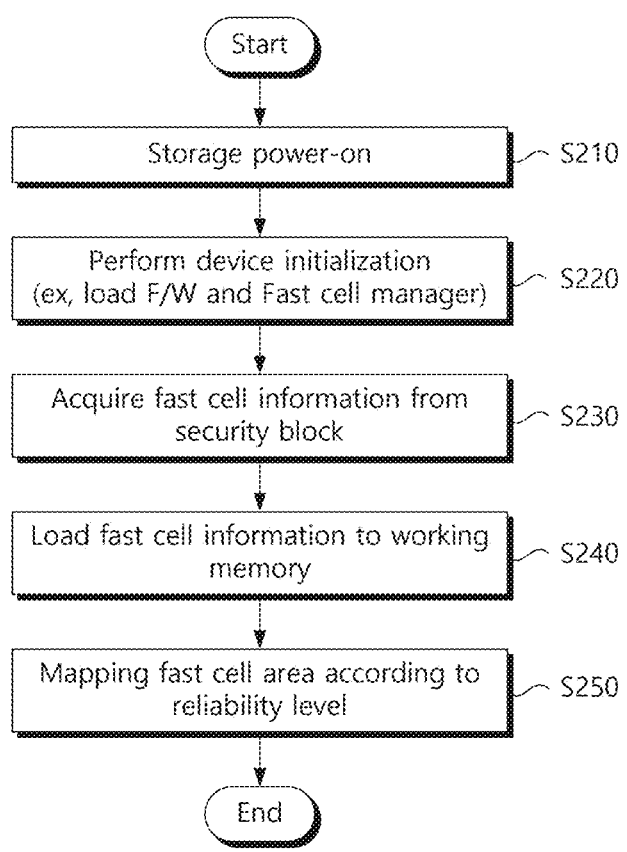
FIG. 6 shows an example of a loading and use policy of fast cell information performed when initializing or booting a storage device according to an embodiment.

FIG. 6 shows an example of loading of fast cell information and fast cell management policy performed when initializing or booting a storage device according to an embodiment. Referring to FIG. 6, the non-volatile memory device 1230 included in the storage device 1200 is provided with fast cell information 1240 acquired through a one-shot program in a test stage or mass production evaluation stage in a programmed state.

In S210, booting or initialization of the storage device 1200 begins. When power is supplied to the storage device 1200 or an initialization command is provided, initialization settings of the storage controller 1210 and the non-volatile memory device 1230 will begin.

In S220, device initialization procedures are performed. For example, for initialization, firmware or software for driving the storage device 1200 is loaded from the storage controller 1210 into the working memory 1213. Firmware or software can be loaded into the working memory 1213 from a separate ROM or storage. In addition, the fast cell manager 1220 for managing fast cells will also be loaded into the working memory 1213 at this time.

In S230, the fast cell information 1240 stored in the security area of the non-volatile memory device 1230 may be output as the fast cell manager 1220 is driven. The output of the fast cell information 1240 stored in the security area may be set to the initialization sequence of the fast cell manager 1220. The fast cell manager 1220 can read the fast cell information 1240 through access to a predetermined security area during initialization. Fast cell information 1240 may include information about the number or location of fast cells in each memory block.

In S240, the fast cell manager 1220 loads the fast cell information 1240 output from the non-volatile memory device 1230 into the memory of the storage controller 1210. That is, the fast cell information 1240 delivered to the storage controller 1210 may be loaded into the working memory 1213 or buffer memory.

In S250, the fast cell manager 1220 may perform memory area mapping according to a management policy for managing the fast cell area based on the loaded fast cell information 1240. For example, the fast cell manager 1220 may allocate a memory area containing fast cells as an area for storing hot data. Hot data refers to data that is frequently updated. And cold data refers to data that, once programmed, is maintained without being updated for a long time. When hot data is stored in a memory block, the data is reprogrammed within a short period of time. Therefore, when hot data is stored in the fast cell area, the effect of reliability deterioration of the memory block due to charge leakage can be reduced. Accordingly, the fast cell manager 1220 can map the hot-cold data area according to the fast cell information

1240. In this case, frequent garbage collection due to reduced reliability can also be suppressed.

Above, the loading and use policy of the fast cell information 1240 performed when initializing or booting a storage device according to an embodiment has been briefly described. The fast cell information 1240 of is provided through the one-shot program performed in the test stage before the firmware is driven. Accordingly, accurate fast cell information can be provided to the storage device 1200. In addition, it will be well understood that mapping to fast cell areas can be applied not only to the allocation of hot-cold data but also to various wear leveling policies.

Figure 7:
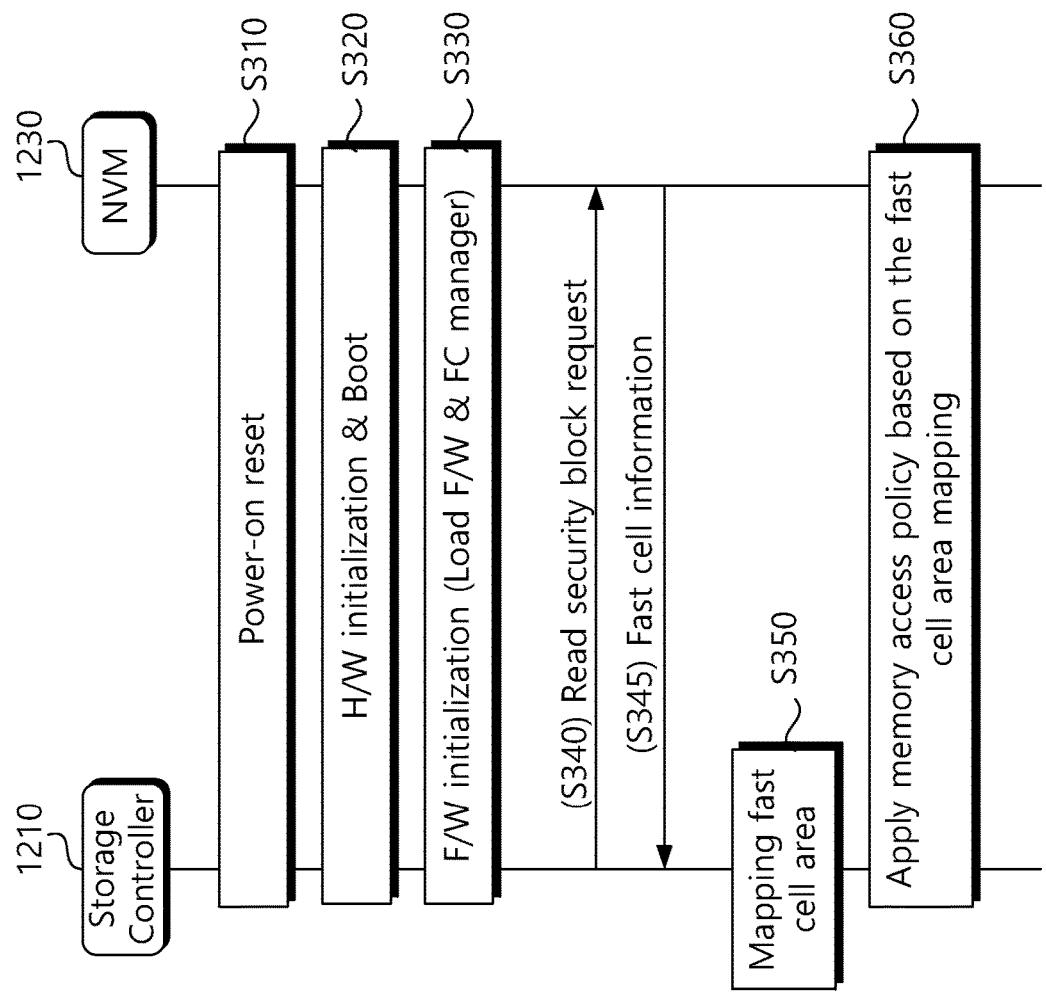
FIG. 7 is a diagram illustrating a procedure for loading fast cell information and setting a usage policy performed during initialization or booting of a storage device according to an embodiment.

FIG. 7 is a diagram illustrating a procedure for loading fast cell information and setting a management policy performed during initialization or booting of a storage device according to an embodiment. Referring to FIG. 7, the storage controller 1210 may read fast cell information 1240 obtained through a one-shot program from the non-volatile memory device 1230 during booting or initialization and load it into memory.

In S310, when power is supplied to the storage device 1200 or an initialization request occurs, a power-on reset is performed. According to the power-on reset, power is supplied to the storage controller 1210 and the non-volatile memory device 1230 that constitute the storage device 1200, and the reset is performed.

In S320, the storage device 1200 may perform hardware initialization and booting. For example, the hardware layers of the storage controller 1210 and the non-volatile memory device 1230 may be initialized or booted. A communication channel between the storage controller 1210 and the non-volatile memory device 1230 may be formed according to initialization of the hardware layer. And a read or write operation of the storage controller 1210 to the non-volatile memory device 1230 will be possible.

In S330, firmware initialization of the storage device 1200 is performed. For example, firmware or software for memory management, such as a host interface layer HIL or a flash translation layer FTL, will be loaded into the working memory 1213 of the storage controller 1210. In addition, the working memory 1213 may be loaded with a fast cell manager 1220 that executes a memory management policy using the fast cell information.

In S340, a security area read request to obtain the fast cell information 1240 is transmitted to the non-volatile memory device 1230 by the fast cell manager 1220. The fast cell information 1240 is already stored in the non-volatile memory device 1230 before the first firmware loading occurs in the storage device 1200. Accordingly, the fast cell information 1240 may be information about an accurate fast cell obtained before a program, erase, or read operation on the non-volatile memory device 1230 by the storage controller 1210 occurs.

In S345, the fast cell information 1240 read from the security area of the non-volatile memory device 1230 is transmitted to the storage controller 1210.

In S350, the fast cell manager 1220 running on the storage controller 1210 will load the fast cell information 1240 output from the non-volatile memory device 1230 into the working memory 1213. And the fast cell manager 1220 will map the memory area of the non-volatile memory device 1230 according to the fast cell management policy based on the fast cell information 1240. For example, the fast cell manager 1220 may map a memory area classified as a fast cell to a frequently updated hot data area. On the other hand, the fast cell manager 1220 may map a memory area classified as a normal cell to a cold data area with a low update frequency. Fast cell management policies are not limited to hot data/cold data areas.

In S360, the fast cell manager 1220 performs a memory management function based on the mapped information. For example, when a write request occurs, the fast cell manager 1220 may allocate frequently updated meta data to a hot data area. On the other hand, in the case of a write request for data that is not frequently updated, the fast cell manager 1220 may allocate it to a cold data area.

In the above, a procedure for obtaining and loading pre-stored fast cell information during booting or initialization of the storage device 1200 has been described. According to the fast cell information loading method, memory management can be performed based on the fast cell information acquired in the test stage or mass production evaluation stage. Therefore, more accurate fast cell information can be provided compared to fast cell information generated after firmware is loaded, thereby improving memory management efficiency.

Figure 8:
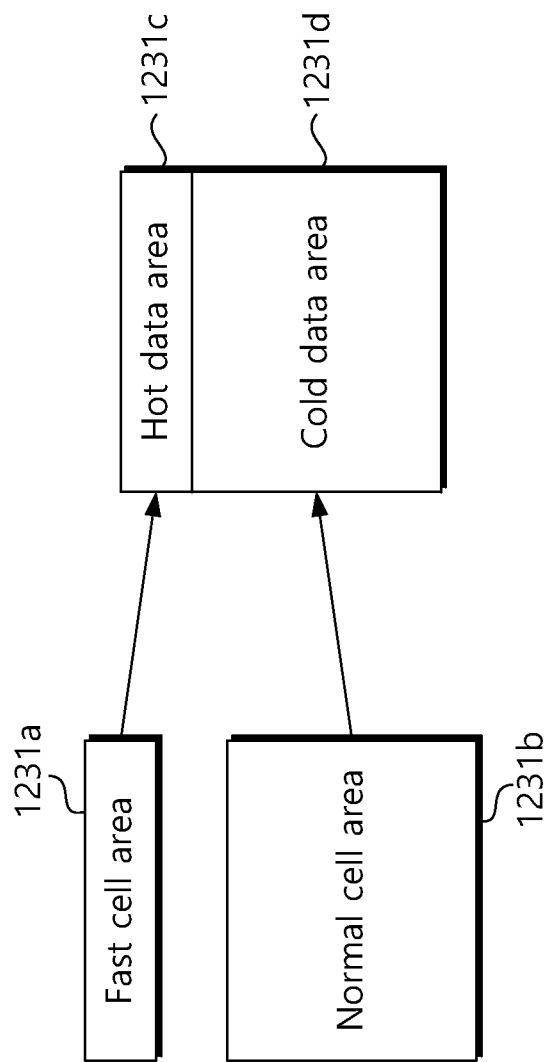
FIG. 8 is a diagram showing an example of a memory management policy based on the fast cell information mentioned in FIG. 7.

FIG. 8 is a diagram showing an example of a memory management policy based on the fast cell information mentioned in FIG. 7. Referring to FIG. 8, the fast cell manager 1220 can allocate a hot data area 1231c and a cold data area 1231d using the fast cell information obtained in the initialization step.

The fast cell manager 1220 performs hot-cold data mapping based on the fast cell information 1240 loaded into the working memory 1213. The fast cell manager 1220 maps the detected fast cell area 1231a to the hot data area 1231c. And the normal cell area 1231b can be mapped to the cold data area 1231d. Mapping can be managed in the form of an address table. And after initialization is completed, if the LBA of the data requested to be written corresponds to the hot data area 1231c, the fast cell manager 1220 will program the requested data to the hot data area 1231c.

If the fast cell area is mapped to the hot data area 1231c, data stored in the fast cell area may be frequently programmed and erased. Accordingly, the data stored in the hot data area 1231c has a short program or erase interval, so there is no need to consider reliability degradation due to retention deterioration. In addition, the number of times frequent garbage collections that are triggered as memory cell reliability deteriorates may be reduced.

FIG. 9 is a flowchart showing the loading and use policy of fast cell information according to another embodiment. Referring to FIG. 9, the non-volatile memory device 1230 included in the storage device 1200 is provided with fast cell information 1240 acquired through a one-shot program in a test stage or mass production evaluation stage in a programmed state.

In S410, booting or initialization of the storage device 1200 begins. When power is supplied to the storage device 1200 or an initialization command is provided, initialization settings of the storage controller 1210 and the non-volatile memory device 1230 will begin.

In S420, device initialization procedures of the storage device 1200 are performed. For example, for initialization, firmware or software for driving the storage device 1200 is loaded from the storage controller 1210 into the working memory 1213. Firmware or software can be loaded into the working memory 1213 from a separate ROM or storage. In addition, a fast cell manager 1220 to perform management policies for fast cells will also be loaded into the working memory 1213.

In S430, the fast cell information 1240 stored in the security area of the non-volatile memory device 1230 may be obtained by loading and executing the fast cell manager 1220. The fast cell manager 1220 can read the fast cell information 1240 through access to a predetermined security area during initialization. Fast cell information 1240 may include information about the number of fast cells in each memory block. Alternatively, the fast cell information 1240 may be the number of fast cells of the word line with the largest number of fast cells among the word lines. Then, the fast cell manager 1220 loads the fast cell information 1240 output from the non-volatile memory device 1230 into the memory of the storage controller 1210. That is, the fast cell information 1240 delivered to the storage controller 1210 may be loaded into the working memory 1213 or buffer memory.

In S440, the fast cell manager 1220 sets adaptive core conditions for fast cells based on the loaded fast cell information 1240. Adaptive core refers to a technology that changes program or erase conditions depending on the program speed of cells. Accordingly, the fast cell manager 1220 can be set to apply a relatively low program voltage when programming memory cells mapped to the fast cell area. For example, if the address provided in the write request corresponds to a fast cell area, the fast cell manager 1220 may instruct the non-volatile memory device 1230 to program conditions that are different from those for normal cells. This adaptive core technology can be applied in the same way not only to write operations but also to erase operations.

In S450, the fast cell manager 1220 detects a program or erase request. When a program or erase command is provided, the fast cell manager 1220 will identify whether the provided address corresponds to a fast cell area.

In S460, the fast cell manager 1220 applies conditions different from those of normal cells to the fast cells selected during a program or erase operation. In short, the non-volatile memory device 1230 will be controlled to apply the program voltage or erase voltage to the selected memory cells according to the adaptive core settings set in S440.

In the above, a method of loading fast cell information 1240 and applying adaptive core technology performed during initialization or booting of a storage device according to an embodiment has been briefly described. The fast cell information 1240 is provided through the one-shot program performed in the test stage before the firmware is driven. Accordingly, accurate fast cell information can be provided to the storage device 1200. In addition, it will be well understood that the mapping policy for the fast cell area can be applied not only to adaptive core technology but also to various memory management policies.

Figure 10B:
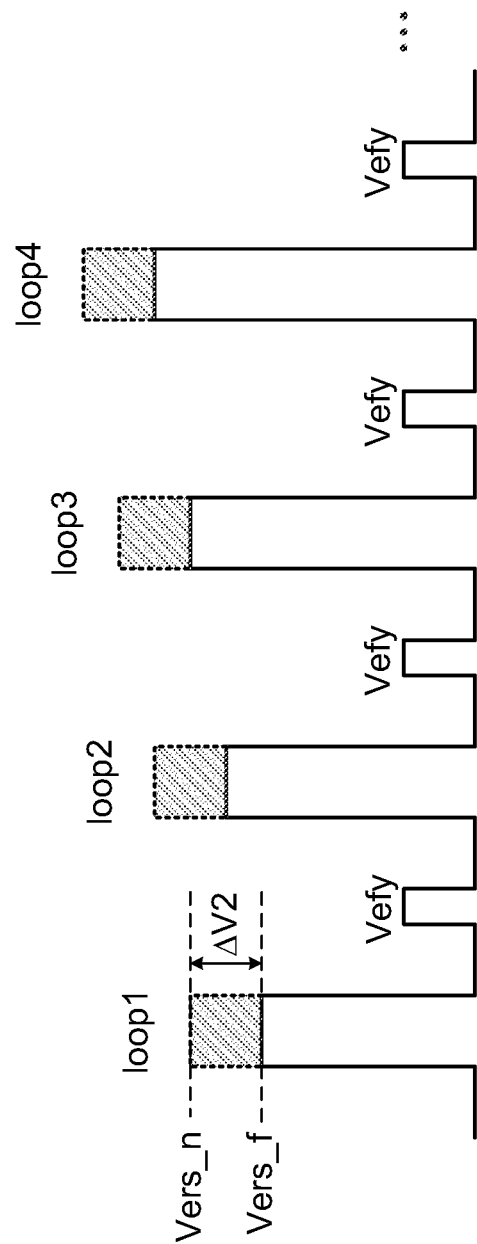

FIG. 10A and FIG. 10B are diagrams showing examples of adaptive core technology according to an embodiment. Referring to FIG. 10A, an example in which different program voltages are applied to fast cells and normal cells is shown.

When a fast cell area is selected for programming, the non-volatile memory device 1230 will start a program loop with a relatively low first program start voltage Vpgm_f. And as the program loop increases, the level of the program pulse also increases. The verification voltage Vfy for program verification can be applied equally to fast cells and normal cells.

On the other hand, when a normal cell area is selected for programming, the non-volatile memory device 1230 will start a program loop with the second program start voltage Vpgm_n. The second program start voltage Vpgm_n is a program start voltage that is higher than the first program start voltage Vpgm_f provided to the fast cell by the first voltage difference $\Delta V1$. As with fast cells, as the program loop increases, the level of the program pulse applied to the normal cell also increases.

Here, the first voltage difference $\Delta V1$ of the program voltage between the fast cell and the normal cell may be a value for converging the programming speeds of the fast cell and the normal cell during a program operation. The first voltage difference $\Delta V1$ may be an experimental value or a value determined through simulation.

Referring to FIG. 10B, an example in which different erase voltages are applied to fast cells and normal cells is shown. When a fast cell area (e.g., a fast cell block) is selected for erasing, the non-volatile memory device 1230 will start an erase loop with a relatively low first erase start voltage Vers_f. And as the number of erase loops increases, the level of the erase pulse also increases. The verification voltage Vefy for erase verification can be applied equally to fast cells and normal cells.

On the other hand, when a normal cell area (or normal cell block) is selected for erasing, the non-volatile memory device 1230 will start an erase loop with the second erase start voltage Vers_n. The second erase start voltage Vers_n is an erase start voltage that is higher than the first erase start voltage Vers_f provided to the fast cell by the second voltage difference $\Delta V2$. As with fast cells, as the erase loop increases, the level of the erase pulse applied to the normal cell also increases.

Here, the second voltage difference $\Delta V2$ of the erase voltage between the fast cell and the normal cell may be a value to match the erase speed of the fast cell and the normal cell during an erase operation. The second voltage difference $\Delta V2$ may be an experimental value or a value determined through simulation.

According to the adaptive core technology applied to the program operation, the fast program/erase speed of fast cells can be compensated, and the threshold voltage distribution of memory cells can be improved.

Figure 11:
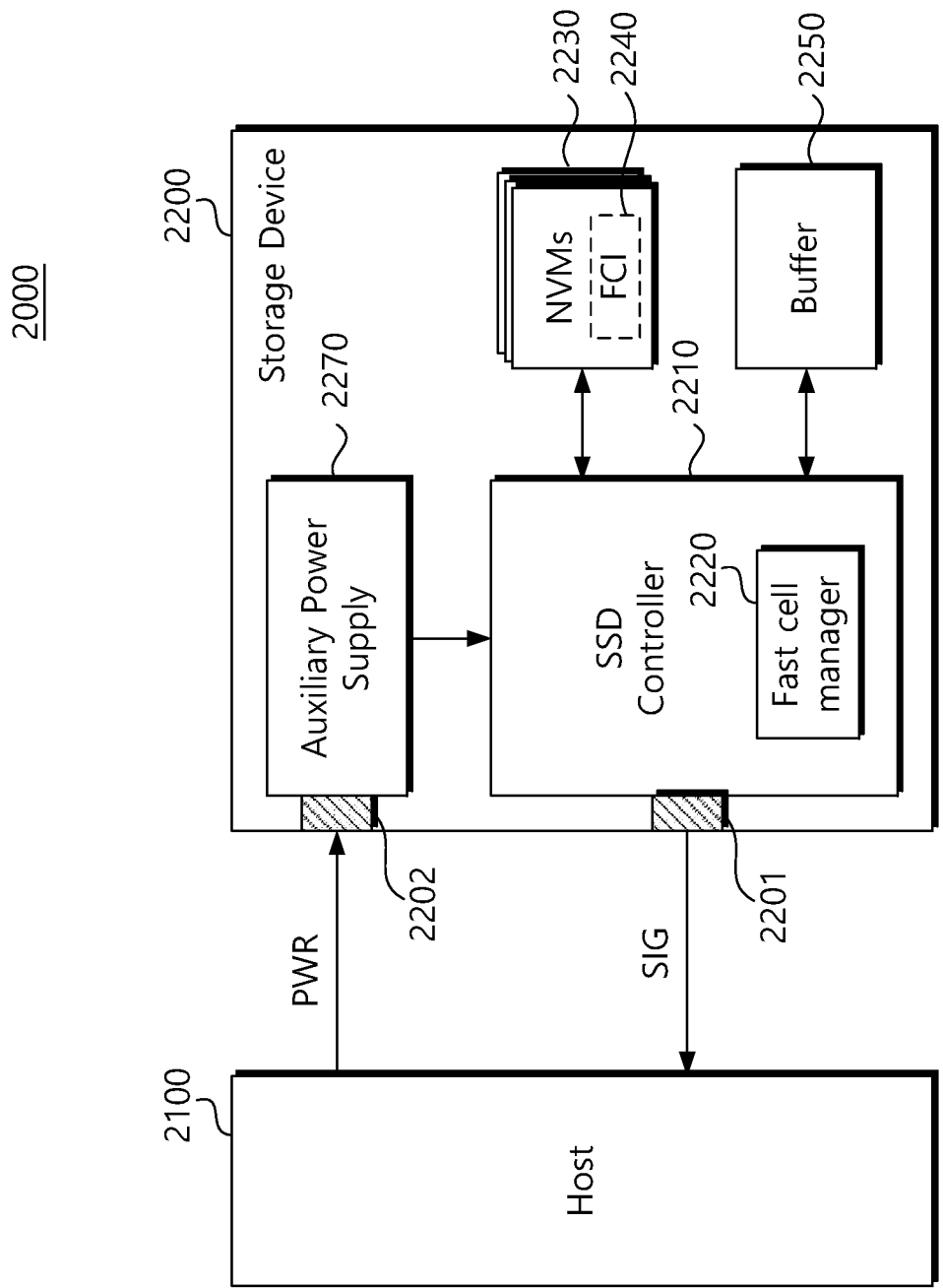
FIG. 11 is a block diagram showing a storage system including a solid state drive according to an embodiment.

FIG. 11 is a block diagram showing a storage system including a solid state drive according to an embodiment. Referring to FIG. 11, the storage system 2000 includes a host 2100 and a storage device 2200 implemented as a solid state drive. In an example embodiment, the host 2100 and the storage device 2200 may be the host 1100 and the storage device 1200 described with reference to FIG. 1 to FIG. 10B. Alternatively, the host 2100 and the storage device 2200 may operate based on the operation method described with reference to FIG. 1 to FIG. 10B.

The storage device 2200 exchanges a signal SIG with the host 2100 through the signal connector 2201 and receives power PWR through the power connector 2202. The storage device 2200 includes an SSD controller 2210, a plurality of non-volatile memories 2230, a buffer memory 2250, and an auxiliary power supply 2270.

The SSD controller 2210 may control a plurality of non-volatile memories 2230 in response to a signal SIG received from the host 2100. The plurality of non-volatile memories 2230 may operate under the control of the SSD controller 2210. The auxiliary power supply 2270 is connected to the host 2100 through the power connector 2202. The auxiliary power supply 2270 can receive power PWR from the host 2100 and charge it. The auxiliary power 2270 may provide power to the storage device 2200 when power supply from the host 2100 is not smooth. The buffer memory 2250 may be used as a buffer memory of the storage device 2200.

In an example embodiment, storage device 2200 may include a fast cell manager 2220. The fast cell manager 2220 performs memory management operations using the fast cell information 2240 stored in the security area of the non-volatile memories 2230 when the storage device 2200 is booted or initialized. For example, the fast cell manager 2220 can manage the program voltage or erase voltage to be applied to the fast cell area differently from that of normal memory cells. Alternatively, the fast cell manager 2220 may use the fast cell area as an area to store frequently updated hot data. The fast cell manager 2220 may be provided in software form and loaded into the memory of the SSD controller 2210, or may be provided as part of the SSD controller 2210 in hardware.

In addition, the non-volatile memories 2230 store data or output the stored data under the control of the SSD controller 2210. In particular, the non-volatile memories 2230 can store fast cell information 2240 in a security area. The fast cell information 2240 is data that is programmed into the security area before the non-volatile memories 2230 are mounted on the storage device 2200. For example, the fast cell information 2240 may be information stored in the non-volatile memories 2230 during the mass production evaluation stage of the non-volatile memories 2230. Accordingly, the fast cell information 2240 is data that is already programmed in the non-volatile memories 2230 before the firmware in the SSD controller 2210 is loaded and driven.

The storage system 2000 described above can perform memory management operations by utilizing the fast cell information 2240 already written in the non-volatile memories 2230 before configuring the storage device 2200. Accordingly, accurate fast cell information generated through a one-shot program at the mass production stage can be used, rather than fast cell information detected after a program or erase operation occurs in the non-volatile memories 2230.

In addition to the above-described embodiments, design changes may be made without departing from the scope of this disclosure. Therefore, the scope of the present disclosure should not be limited to the above-described embodiments, and should be defined by the claims and equivalents of the claims.

What is claimed is:

1. A storage device comprising:
a non-volatile memory device configured to store fast cell information obtained from a threshold voltage distribution formed through a one-shot program for memory cells; and
a storage controller configured to read the fast cell information from the non-volatile memory device during booting or initialization to perform mapping a fast cell area based on a fast cell management policy,
wherein the fast cell information is acquired through the one-shot program performed in a test stage or a mass production evaluation stage, and is stored in the non-volatile memory device before a firmware of the storage controller is executed.

2. The storage device of claim 1, wherein the one-shot program corresponds to a single program loop that applies one program voltage pulse to the memory cells.

3. The storage device of claim 1, wherein the fast cell information is stored in a security area of the non-volatile memory device.

4. The storage device of claim 1, wherein the fast cell information corresponds to a number of memory cells or read data formed as a result of the one-shot program for memory cells whose threshold voltage is higher than a reference read voltage.

5. The storage device of claim 1, wherein the storage controller comprises a fast cell manager configured to load the fast cell information into a working memory at a time of a booting or the initialization and perform the fast cell management policy based on the fast cell information.

6. The storage device of claim 5, wherein the fast cell manager is further configured to map the fast cell area in a cell area of the non-volatile memory device based on the fast cell management policy.

7. The storage device of claim 6, wherein the fast cell manager is further configured to allocate the fast cell area as a hot data area, based on the fast cell management policy, to designate the fast cell area as a write area for hot data, wherein a number of updates per hour of the hot data exceeds a reference value.

8. The storage device of claim 6, wherein the fast cell manager is further configured to perform an adaptive core policy that controls the non-volatile memory device to provide a program voltage or erase voltage different from that of a normal cell area based on a write or erase request for the fast cell area being received.

9. A method of operating a storage device, the method comprising:
loading a firmware for driving the storage device into a working memory of a storage controller;
reading a fast cell information programmed in a security area of a non-volatile memory device;
loading the fast cell information into the working memory;
mapping a fast cell area based on the loaded fast cell information; and
applying a fast cell management policy when accessing the mapped fast cell area,
wherein the fast cell information is provided in a programmed state in the security area of the non-volatile memory device before an initialization of the firmware.

10. The method of claim 9, further comprising:
generating the fast cell information corresponding to first memory cells of the non-volatile memory device through a one-shot program; and
programming the fast cell information into the security area.

11. The method of claim 10, wherein threshold voltages of the first memory cells are higher than a reference read voltage.

12. The method of claim 11, wherein the fast cell information corresponds to a value calculated by counting a number of fast cells on a word line unit or a memory block unit, or the fast cell information corresponds to data values read on the word line unit or the memory block unit.

13. The method of claim 9, wherein the mapping comprises allocating the fast cell area to a hot data area, and allocating a normal cell area to a cold data area.

14. The method of claim 9, wherein the mapping comprises allocating the fast cell area a management area having a first program voltage or a first erase voltage that is different from a second program voltage or a second erase voltage of a normal cell area.

15. The method of claim 14, further comprising, based on a request for the access to the fast cell area occurring, applying the first program voltage or the first erase voltage to a word line of the fast cell area, wherein the first program voltage and the first erase voltage are respectively lower than the second program voltage and the second erase voltage used for the normal cell area.

16. A storage device comprising:
- a non-volatile memory device storing a fast cell information; and
- a storage controller configured to:
  - load and execute a firmware in a working memory during booting or initialization,
  - read the fast cell information from the non-volatile memory device, and apply a fast cell management policy based on the fast cell information,
- wherein the fast cell information is generated in a test stage or a mass production evaluation stage of the non-volatile memory device to be provided in a programmed state in the non-volatile memory device before the firmware is executed.

17. The storage device of claim 16, wherein the fast cell information is obtained through a one-shot program performed in the test stage or the mass production evaluation stage.

18. The storage device of claim 17, wherein the one-shot program corresponds to a single program loop in which single program voltage pulse is applied to memory cells of the non-volatile memory device.

19. The storage device of claim 16, wherein a fast cell area containing a fast cell is allocated as a hot data area according to the fast cell management policy, and
- wherein the hot data area corresponds to a write area of hot data whose number of updates per hour exceeds a reference value.

20. The storage device of claim 16, wherein the fast cell management policy comprises an adaptive core policy that controls the non-volatile memory device to provide a different program voltage or erase voltage than that of a normal cell area based on a write request or an erase request being received for a fast cell area.

* * * * *